United States Patent

[11] 3,632,465

| [72] | Inventor | Derek D. Hardingham<br>c/o Suite 200 18582 Beach Blvd.,<br>Huntington Beach, Calif. 92646 |
|---|---|---|
| [21] | Appl. No. | 809,165 |
| [22] | Filed | Mar. 21, 1969 |
| [45] | Patented | Jan. 4, 1972 |

[54] LAMINATED PROTECTIVE COATING FOR METALLIC SURFACES
6 Claims, 10 Drawing Figs.

[52] U.S. Cl. .................................................. 161/54,
156/71, 156/92, 161/145, 161/149, 161/156,
161/196, 220/63 R
[51] Int. Cl. ........................................................ B32b 3/06,
B32b 7/08
[50] Field of Search ............................................. 161/38–40,
44, 48, 149, 145, 196, 192, 54, 53, 156, 170;
156/71, 91, 92, 249, 309, 509; 220/63 R; 161/192,
54, 53, 156, 170

[56] References Cited
UNITED STATES PATENTS

| 2,342,058 | 2/1944 | Morris ........................... | 52/249 |
| 2,824,664 | 2/1958 | French et al. ................ | 220/81 |
| 3,149,693 | 9/1964 | Keller et al. .................. | 156/71 X |
| 3,325,043 | 6/1967 | Habozit et al. ............... | 220/63 |
| 3,415,709 | 12/1968 | Santangelo ................... | 161/149 X |
| 3,423,264 | 1/1969 | Miron et al. .................. | 52/249 X |
| 3,502,327 | 3/1970 | Meyer .......................... | 161/44 X |

*Primary Examiner*—John T. Goolkasian
*Assistant Examiner*—D. J. Fritsch
*Attorney*—William C. Babcock ABSTRACT: A laminated protective coating for a metallic surface subject to a deteriorating environment, which coating includes (a) a first resin-impregnated laminate applied to the surface while said resin is in a gellike state; (b) a plurality of spaced rigid studs that extend through said first laminate into said metal surface and serve to hold a plurality of flat rigid washers in abutting contact with the exterior surface of said first laminate to mechanically bond said laminate to said surface; and, (c) a second sheet laminate that is substantially inert to said deteriorating environment that is resin bonded to said first laminate to overlie the exterior surface thereof and the exterior surface of said washers.

PATENTED JAN 4 1972 3,632,465
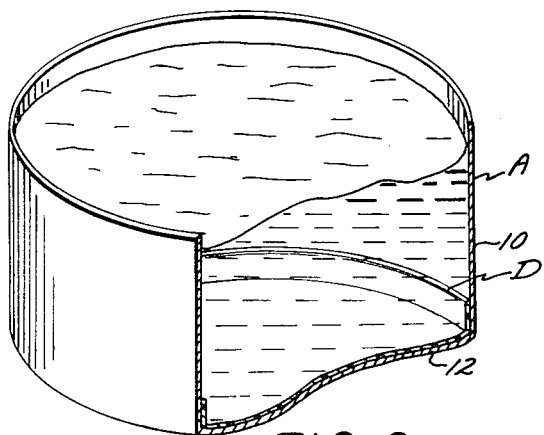
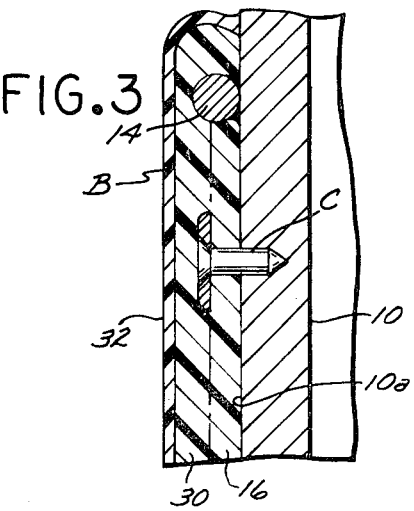
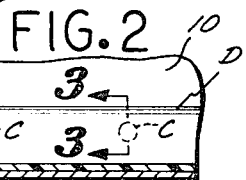
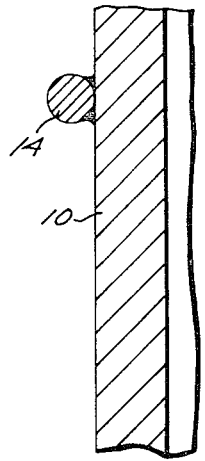
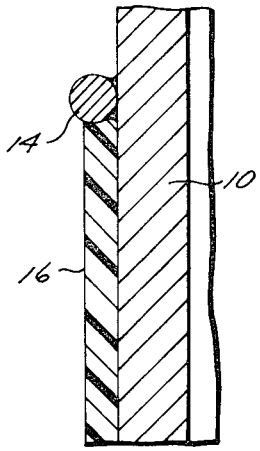
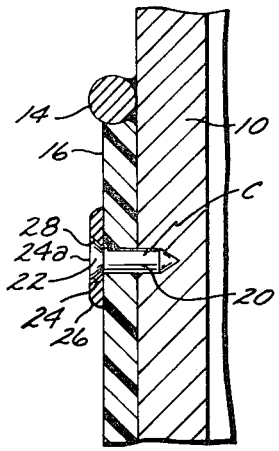
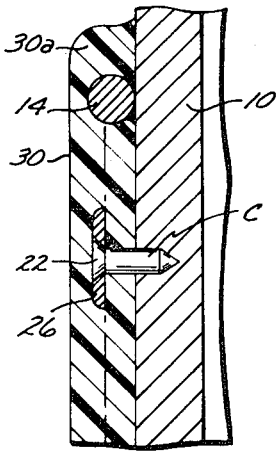
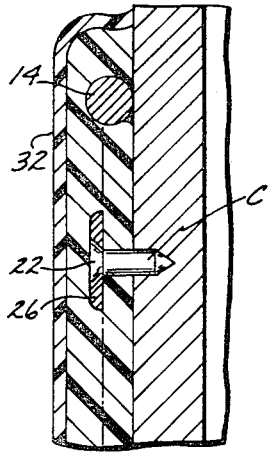
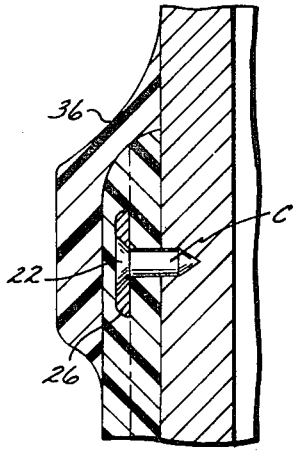
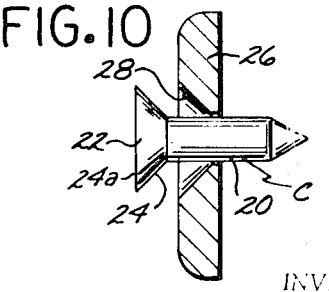
INVENTOR.
DEREK D. HARDINGHAM
BY
William G. Babcock
ATTORNEY 3,632,465

LAMINATED PROTECTIVE COATING FOR METALLIC SURFACES

BACKGROUND OF THE INVENTION

1. Field of the Invention

Laminated protective coating.

2. Description of the Prior Art

In many industrial situations, metallic surfaces are subject to an environment wherein they deteriorate due either to chemical or physical action. Deterioration of metallic surfaces is particularly severe in large steel tanks in which crude oil containing water is stored, as well as the interior surfaces of steam condensers that are subject to a hot, moist environment. Metallic surfaces, such as the exterior surfaces of marine propellers, may also deteriorate rapidly due to cavitation and abrasion. In the past, metallic surfaces subject to chemical or physical deterioration, protective layers have been applied thereto by adhesive agents, but this securing means has been found unsatisfactory in several respects.

One of the operational disadvantages in securing a protective coating to a metallic surface is that the surface must first be thoroughly cleansed by sandblasting or other means, prior to application of the protective coating thereto. Also, the protective coating must be applied or adhered to the sandblasted surface immediately after the sandblasting, for otherwise the surface will oxidize, and a poor bond will be secured between the protective layer and the base metal. Application of the protective coating immediately after the sandblasting operation is in many instances literally impossible, such as when a protective coating is applied to the interior surface of a large oil storage tank.

Also, even if a metallic surface is thoroughly cleansed, there is no assurance that a protective layer bonded thereto by an adhesive will remain in place, if the surface is subject to severe vibration or the cavitating action of a fast moving stream of fluid.

The present invention overcomes the difficulties and operational disadvantages of previously available protective coatings by providing a coating in which a first laminate is mechanically bonded to a base metal, with a second laminate being resin bonded to the first laminate to protect the mechanical means employed to secure the first laminate to the base metal.

SUMMARY OF THE INVENTION

A protective coating for a base metal that includes a first laminate secured to the metal by mechanical means, and a second laminate resin bonded to the first laminate to overlie the exterior surface thereof, as well as the exterior surfaces of said mechanical means.

A major object of the present invention is to provide an improved protective coating for a base metal, which coating is of a laminated structure and includes a first laminate secured by mechanical means to a base metal, and a second laminate that is resin bonded to the clean exterior surface of the first laminate.

Another object of the invention is to provide a protective coating on a base metal without the necessity of sandblasting the metal to the extent that a fresh metal surface is exposed, and thereafter immediately applying the protective coating to this fresh surface.

A further object of the invention is to furnish a protective coating that is ideally adapted for installations in cramped quarters, is of simple structure, and may be formed from standard, commercially available materials.

A still further object of the invention is to furnish a protective coating that will remain on a base metal surface, even when this surface is subjected to substantial vibration or the action of flowing fluids that would, without the protection of the coating, cause cavitation and deterioration of the base metal.

BRIEF DESCRIPTION OF THE DRAWINGS

FIG. 1 is a perspective view of a storage tank, partially broken away to show a protective coating covering the lower interior portion thereof;

FIG. 2 is a fragmentary vertical cross-sectional view of the lower portion of the tank;

FIG. 3 is a transverse cross-sectional view of a portion of the tank wall, taken on the line 3—3 of FIG. 2;

FIG. 4 is a fragmentary vertical cross section of a tank wall to which a protective ring is welded at the elevation where the protective covering terminates;

FIG. 5 is the same view as that shown in FIG. 4 after a first protective laminate in the form of a resin-impregnated mat of fibrous glass has been laid onto the interior surface of the tank wall;

FIG. 6 is the same view as that shown in FIG. 5, but after a number of spaced studs have been driven through the mat into the tank wall to dispose a number of flat washers in abutting contact with the exterior surface of the mat;

FIG. 7 is the same view as that shown in FIG. 6 after a second laminate of resin-impregnated fibrous glass has been adhered to the exterior surface of the first laminate to cover and protect said washers and the heads of said studs, with the upper portion of said second laminate extending around said ring to abut against and seal with the interior surface of said wall;

FIG. 8 is the same view as that shown in FIG. 7, but after a finish film has been applied to the exterior surface of the second laminate;

FIG. 9 is a fragmentary, vertical, cross-sectional view of a tank wall illustrating a second means of terminating the upper portion of the protective coating when a ring is not secured to the interior surface of the tank wall; and FIG. 10 is a cross-sectional view of one of the studs and associated washers used in securing the first laminate to a base metal that is to be protected.

DESCRIPTION OF THE PREFERRED EMBODIMENT

In the oil industry, crude oil that may contain a substantial cut of water is stored in large tanks, of which the tank A shown in FIG. 1, is typical. When the crude oil is stored in such a tank, it separates into a lower layer of water, and upper layer of oil. The lower water layer is frequently acidic in character and has an adverse effect on the steel of the tank A with which it comes into contact. The tank A includes a cylindrical sidewall 10 and bottom 12. The protective coating B, shown in FIG. 1, covers the interior surface of sidewall 10 to a height substantially greater than that of the thickest layer of water (not shown) that will be present in the tank. The entire surface of the bottom 12 that is in contact with the layer of water is also covered with the coating B.

The interior surface 10a of the sidewall 10 preferably has a circumferentially extending and horizontal protective steel ring 14 welded thereto, as shown in FIG. 4. The height of the ring 14 determines the height of the upper extremity of the protective coating B.

The surface 10a below ring 14 is cleansed of loose foreign material to provide a solid base against which the protective coating B abuts. In the application of the protective coating B it is not essential that the interior surface 10a be defined by thoroughly cleansed base metal, such as obtained by sandblasting.

After a solid surface 10a has been obtained, a first laminate 16 in the form of a resin-impregnated mat of fibrous glass is laid thereon. The entire interior surface of the bottom 12 is likewise covered with the first laminate 16. The first laminate 16 terminates at the protective ring 14, as shown in FIG. 4, and is in abutting contact therewith.

Steel studs C are then fixed at desired circumferential and vertical spacing through the first laminate 16 into the base metal defining the sidewall 10, as shown in FIG. 6. Firing of the studs C into the sidewall 10 is accomplished by a Hilte gun, or like apparatus.

Each stud C includes a bolt 18 having a shank 20 and head 22. The head 22, as shown in FIG. 10, has a frustoconical side surface 24 and an end surface 24a. Each stud C includes a circular washer 26 in which a centrally disposed tapered bore 28 is formed through which the shank 20 extends. The bore 28 is angularly tapered to the same degree as the side surface 24. When one of the studs C is fired into the sidewall 10, the shank 20 is partially embedded therein, and with the washer 26 being in abutting contact with the outer surface of the first laminate 16. Firing of the studs C into the sidewall 10 is carried out as soon as possible after the first laminate 16 is applied to the surface 10a, and the resin in the laminate has initially set in a solid state. The full curing of the resin will continue after the initial set.

After the studs C have been fired into the tank wall 10 as above described, and while the resin in first laminate 16 is still tacky, a second laminate 30 is laid over the first laminate. The second laminate 30 is also comprised of a resin-impregnated mat of fibrous glass. As the resin in the second laminate 30 sets, it merges with the still tacky resin of the first laminate 16 to the extent that the two laminates become an integral unit, with the washer 26 sandwiched therebetween in a position where they will not be contacted by the acidic water in tank A.

The upper portion 30a of the second laminate 30 is folded over the protective ring 14, as shown in FIG. 7, and seals against the interior surface 10a of sidewall 10. The ring 14 and upper portion 30a of the second laminate cooperatively define an upper, horizontal, circumferentially extending margin D for the protective coating B, as shown in FIG. 3. A protective finish coat 32 may be applied by brushing, spraying, or the like, to the exposed surface of the second laminate 30, if desired. The same procedure just described is used in applying the protective coating B to the exposed surface of the bottom 12.

When the sidewall 10 of the tank A does not include a ring 14, an upper margin D' may be defined by affixing a horizontal, circumferentially extending strip 36 of a resin-impregnated mat of fibrous glass to the upper portions of the first and second laminates 16 and 30, as shown in FIG. 9, as well as bonding the strip 36 to the interior surface of the sidewall.

The protective covering B has been illustrated as being applied to the interior surface of a tank, but there is no intent to limit the covering to such use, for the covering B may be employed to equal advantage in protecting any surface that is subject to a deteriorating environment due to the presence of physical or chemical agents.

Other uses for the protective coating described herein include, but are not limited to use in protecting the interior surfaces of marine and industrial condensers, the interior surfaces of pumps, and underwater surfaces of marine propellers, rudders, and other areas subject to corrosion, erosion, and high frictional conditions.

The resins used in impregnating the fibrous glass in the first and second laminates may be any of the thermosetting resins commercially available for such purposes. The thermosetting resin selected should, of course, be insoluble in any liquid to which the protective coating is exposed.

The method of applying the protective coating may be summarized as follows:
1. Cleanse the parent material, preferably down to a freshly exposed metallic surface.
2. Apply a primer to the cleansed surface, if such is recommended by the manufacturer of the resin selected for impregnating the fibrous glass of the first laminate.
3. Apply the first laminate to the cleansed surface.
4. Fire the studs in a predetermined spaced pattern through the first laminate into the parent material, prior to complete curing of the resin in the first laminate, but after the resin has taken an initial set where it is three-dimensionally stable.
5. Apply the second resin-impregnated laminate to the first laminate to sandwich and seal exposed portions of the studs between the two laminates, with the resins in the two laminates merging at their interface into one another and curing as a unified body.
6. Apply a finish coat to the second laminate, if such coat is desired.

This method may be carried out with the use of any commercially available stud gun.

The laminates 16 and 30 are applied to the surface 10a while in a pliable state, and may be easily shaped to conform to any curvature therein. It will be particularly noted in the drawings that the washers 26 are flat and relatively thin. Due to this structure of the washers 26, and the pliable nature of the second laminate 30 at the time of application, there is little or no bulge in the portions of the second laminate overlying the washers.

I claim:
1. In combination with a shell of metal having at least one external surface that is to be protected, with at least a portion of said surface of curved configuration, a laminated protective coating extending over said surface and in surface contact therewith, which coating includes:
   a. a first laminate in the form of a resin-impregnated mat of fibrous glass that is laid onto said surface to conform to the contour thereof when said resin is in a gel-like state;
   b. mechanical means extending through said first laminate into said body for supporting said first laminate on said surface;
   c. a second laminate in the form of a resin-impregnated mat of fibrous glass that is laid onto said first laminate when the resin in said first laminate is in an initially set state, with said resins in said first and second laminates merging one into the other at the interface thereof as final cure thereof occurs to provide a unified laminated structure in which portions of said mechanical means are sandwiched in protected positions therein, which merged resins serve to bond said second laminate to said first laminate; and
   d. an elongate rigid member rigidly secured to said surface, with a first edge of said first laminate abutting against a side edge of said member, and a first portion of said second laminate extending over said elongate member and bonded thereto, which elongate member and first portion of said second laminate cooperatively provide a margin to define one edge of said protective coating.

2. The combination as defined in claim 1 in which said member includes at least a portion of a rigid ring rigidly secured to said surface and in abutting contact with a first circumferential edge of said first laminate, and said second laminate extending over said ring to envelope the latter with said second laminate having a first edge thereof in abutting contact with said surface and bonded thereto.

3. The combination as defined in claim 1 wherein said mechanical means comprise a plurality of metallic studs that are in spaced relationship.

4. The combination as defined in claim 1 wherein said mechanical means comprise a plurality of metallic stud assemblies that are in spaced relationship, each of which assemblies include:
   d. a washer disposed between said first and second laminates; and
   e. a bolt including a head and shank, which head is in abutting contact with a central portion of said washer, with said shank extending through said washer and first laminate, and with that portion of said shank outermost from said head being embedded in said body.

5. The combination as defined in claim 4 wherein each of said bolts has a frustoconical head, and in each of which washers a conical bore is formed wherein said head fits snugly, with said head and washer being of substantially the same thickness.

6. The combination as defined in claim 4 wherein said head and washer are sufficiently thin that said second laminate does not bulge appreciably when laid over said head and washer.

* * * * *